United States Patent [19]
Simoni

[11] Patent Number: 6,042,912
[45] Date of Patent: Mar. 28, 2000

[54] WINDOW DRESSING

[76] Inventor: Helen Simoni, 205 Titusville Rd., Poughkeepsie, N.Y. 12603

[21] Appl. No.: 08/920,212

[22] Filed: Aug. 25, 1997

[51] Int. Cl.$^7$ ....................................................... B44C 5/08
[52] U.S. Cl. .............................. 428/38; 428/15; 428/17; 428/101; 33/563; D10/64
[58] Field of Search ............... 428/15, 38, 101, 428/17; 33/563; D10/64

[56] References Cited

U.S. PATENT DOCUMENTS

| | | | |
|---|---|---|---|
| 2,074,482 | 3/1937 | Martens | 428/101 X |
| 3,713,958 | 1/1973 | McCraken | 428/38 |
| 3,815,263 | 6/1974 | Oberwager | 428/38 X |
| 4,078,492 | 3/1978 | Levy et al. | 428/38 X |
| 4,619,850 | 10/1986 | Charlton | 428/38 |
| 5,396,408 | 3/1995 | Szczech, III | 428/38 X |

Primary Examiner—Deborah Jones
Assistant Examiner—Abraham Bahta
Attorney, Agent, or Firm—Sofer & Haroun, LLP

[57] ABSTRACT

A decorative window dressing that includes a border cut-out design sheet having the design cut-out for permitting light to pass through, a colored middle layer and a backing sheet. The colored layer is placed between the border cut-out and the backing sheet, where the border sheet and colored middle layer are secured to the backing sheet and positioned within a window frame such that the incoming light is in the shape of the cut-out design. The window dressing may be attached to spring loaded roller hung within a window pane or to a hanging bar for rotation along its vertical axis.

15 Claims, 10 Drawing Sheets

WINDOW DRESSING

FIELD OF THE INVENTION

This invention relates to window dressings, and in particular, to decorative window shades having a border in a multitude of patterns, a colored sheet and a supporting backing sheet.

BACKGROUND OF THE INVENTION

There are numerous window treatment products in the marketplace for regulating or completely blocking out incoming light and for affording privacy in homes and apartments. Window shades are generally pieces of opaque fabric or material which are spring wound about a roller rod, which in turn is hung near the top of the window. By lowering and raising the shade, a desired amount of incoming light may be allowed into a room. Horizontal blinds, commonly known as Venetian blinds, consist of thin horizontal slats that may be raised, lowered and set at a desired angle to regulate the amount of light admitted. Vertical blinds are generally made up of layered individual slats of plastic connected to an upper member which overlay each other and which may hang freely or may be connected to one another and which are controlled by a hanging cord or rod. Venetian blinds and verticals permit regulation of incoming light by pulling the cord or twisting the rod so that the individual slats open or close so that only the desired amount of light is permitted to enter.

Unfortunately, window shades, Venetian blinds and verticals are generally visually unattractive. There have been attempts to improve the attractiveness and aesthetic appeal of window shades. For example, U.S. Pat. No. 4,078,492 discloses a light transmitting window shade which provides the appearance of a stained glass window. This window shade is comprised of an elongated light transparent plastic sheet having a colored reproduction of a stained glass assembly on one surface of the sheet. This sheet is embossed or laminated to a second frosted base sheet to achieve the desired privacy. Both sheets are attached at one end to a spring loaded roller for mounting above or within a window pane and are extended by pulling the lower end of the sheets downward. These shades, however, are limited to the appearance of the stained glass windows, and do not provide a mechanism for altering the design of the window shade, once the shade has matured into a final product. Specifically, the design on these shades cannot be altered once the shade has been constructed.

U.S. Pat. No. 5,396,408 discloses a detachable window ornament in the field of illuminated decorations, having a light transmissive front panel and an enclosure or plenum containing at least one light source and a power source. This decorative ornament is attached to the window by means of suction cups. This invention, however, requires a power source in order to be operable, and does not function akin to shades in regulating the amount of light entering through the window.

Other attempts at providing decorative window effects are described in U.S. Pat. Nos. 3,713,958, 3,815,263, and 4,619,850. However, these references disclose methods for decorating windows by applying colored transparent sheets directly to the window. These methods afford little in the manner of manufacturing shades that would allow for regulation of the amount of light entering through the window.

Accordingly, there is a need for a decorative window treatment in the form of a shade which permits regulation of the amount of incoming light and which may also be provided in a variety of colorful designs that provide a unique effect on light passing through the shade.

OBJECTS AND SUMMARY OF THE INVENTION

It is thus a general object of the present invention to provide a decorative window dressing for hanging within a window frame in a home or apartment.

A more specific object of the present invention is to provide a decorative window dressing for hanging within a window frame in a home or apartment, which provides an aesthetically pleasing and colorful effect to light entering the window and passing through the decorative window dressing, while allowing the user to alter the light entering through the window.

It is another object of the present invention to provide a decorative window dressing which may afford a single or plurality of colors to the sunlight passing through the decorative window dressing.

It is a further object of the present invention to provide a decorative window dressing having a border cut-out design sheet which may be detachable to allow the user to alter the designs to provide different looks to the shades constructed in accordance with the present invention.

These and other objects of the invention are realized by providing a decorative window dressing having a border cut-out design sheet which includes a cut-out portion in the configuration of a design or border for permitting light to pass therethrough when the decorative window dressing is mounted within a window frame. A colored middle layer is secured by a backing sheet for portioning between the backing sheet and the border cut-out design sheet. When said decorative window dressing is mounted within a window frame extended in the window, incoming light which passes through said cut-out portion in said border cut-out design sheet creates an aesthetically pleasant colorful effect within the room.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings in which like reference characters denote similar elements throughout the several views.

DETAILED DESCRIPTION OF THE PRESENTLY PREFERRED EMBODIMENT

Figure 1A:
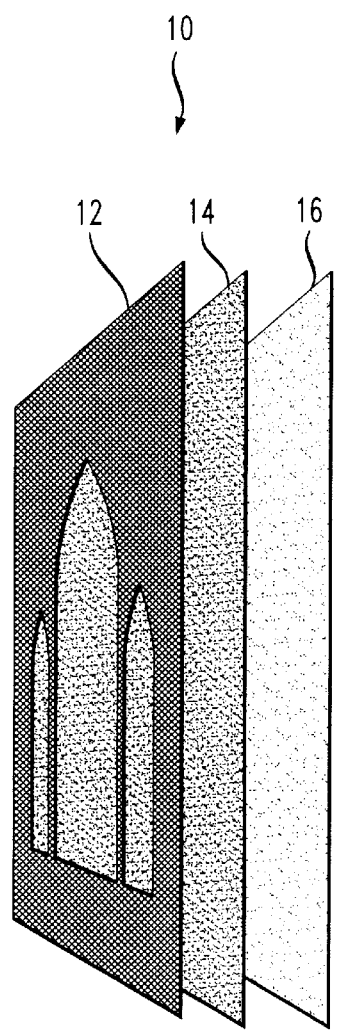
FIGS. 1a, 2a and 3a illustrate exploded views of the three layers which comprise the decorative window dressings of the present invention.
Figure 1B:
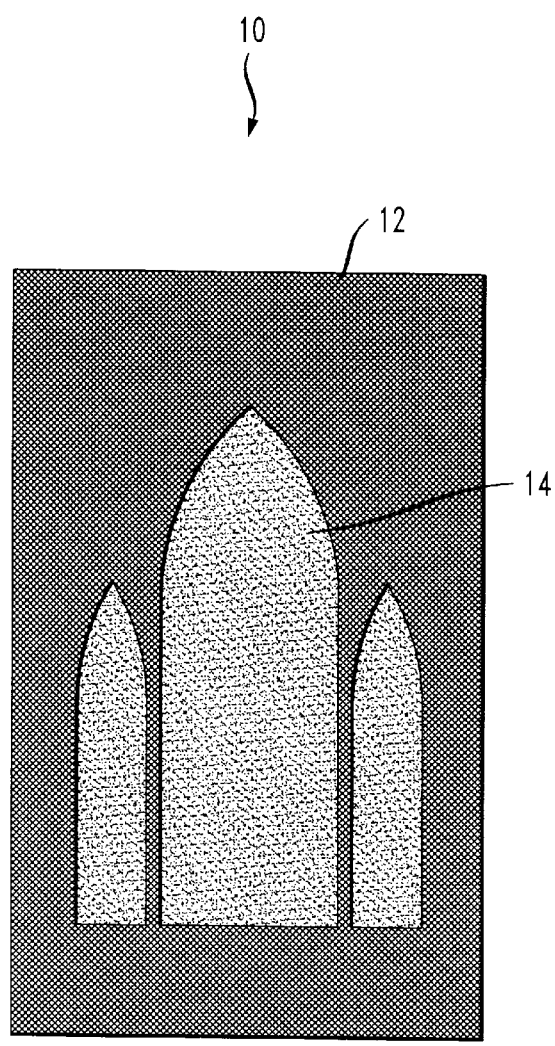
FIGS. 1b, 2b, and 3b illustrate front elevational views of the decorative window dressings illustrated in FIGS. 1a, 2a and 3a respectively.
Figure 2A:
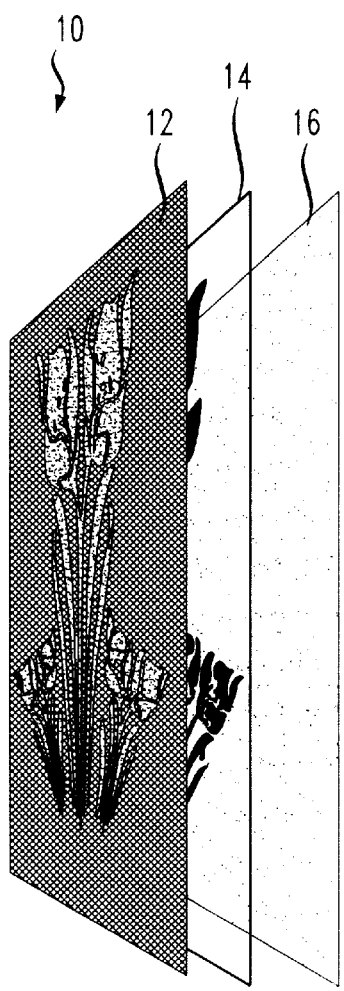
Figure 5:
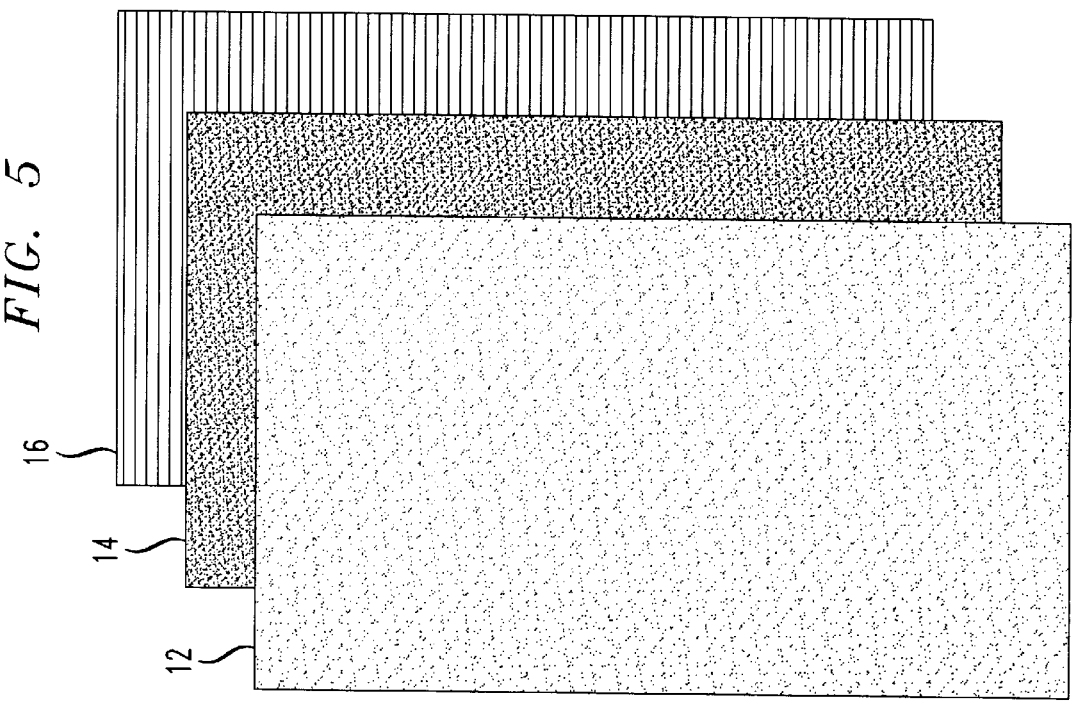
FIG. 5 illustrates an exploded elevational view of the layers which comprise the decorative window dressings of the present invention.

Referring now to the drawings for a more detailed description of the present invention and more particularly to FIGS. 1a and 1b thereof, the decorative window dressing 10 is shown and described. Decorative window dressing 10 is comprised of a top border cut-out design sheet 12, a middle, colored sheet 14 and a backing sheet 16. Border cut-out design sheet 12, colored sheet 14 and backing sheet 16 are arranged upon one another as illustrated in FIGS. 1a, 2a and 3a, and as illustrated from the side and front in FIGS. 4 and 5 respectively.

Figure 2B:
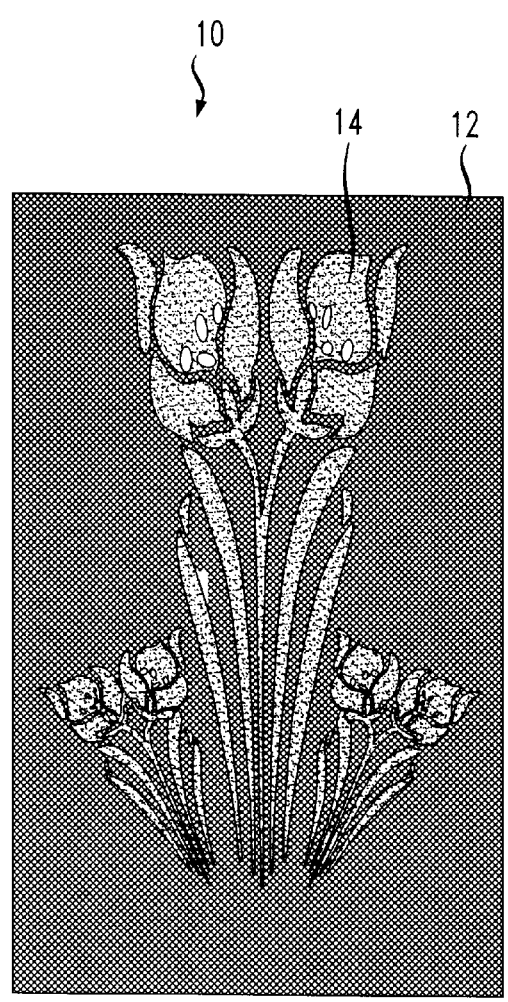
Figure 6:
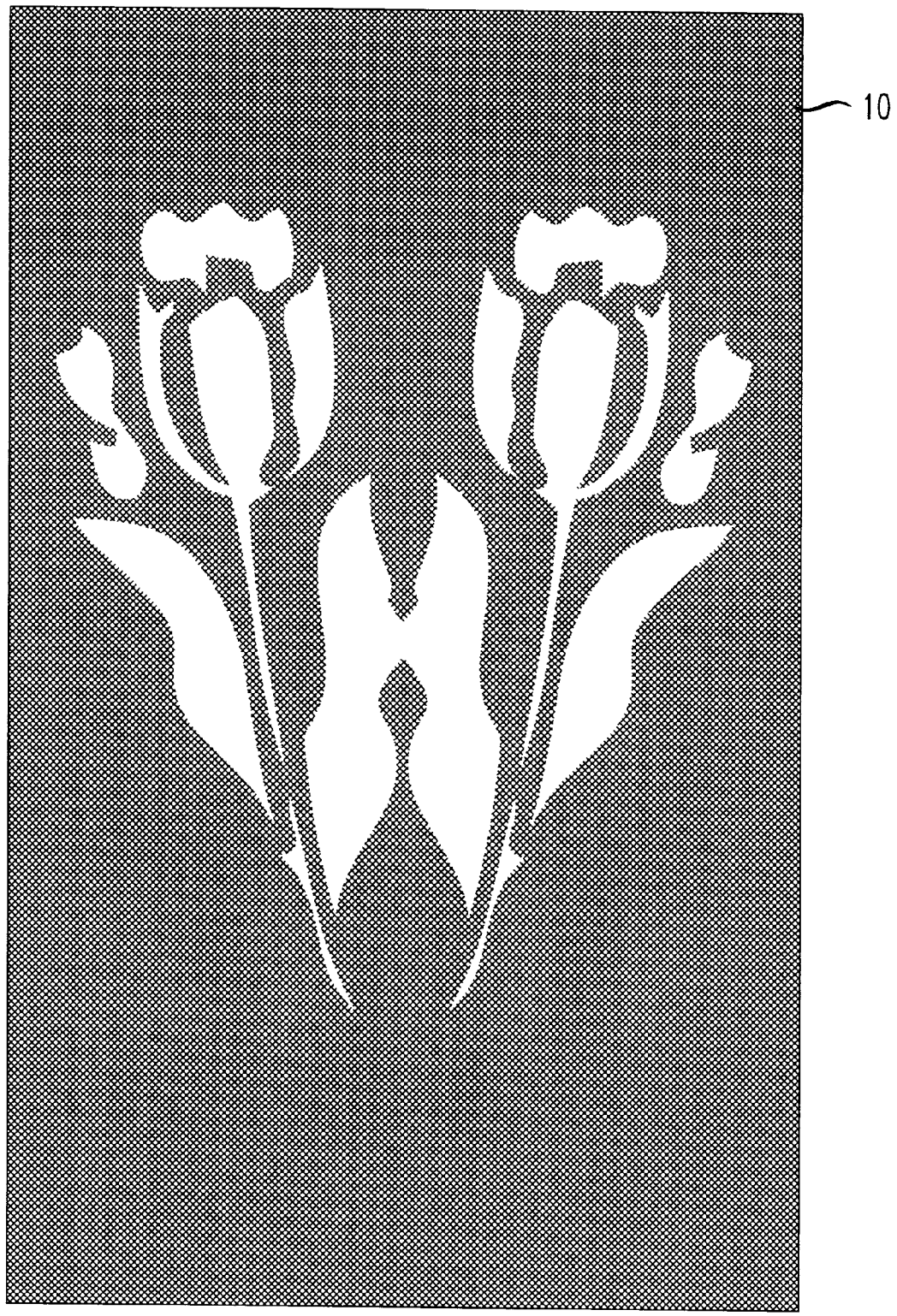
FIGS. 6–10 illustrate different border cut-out design sheets according to the present invention.
Figure 7:
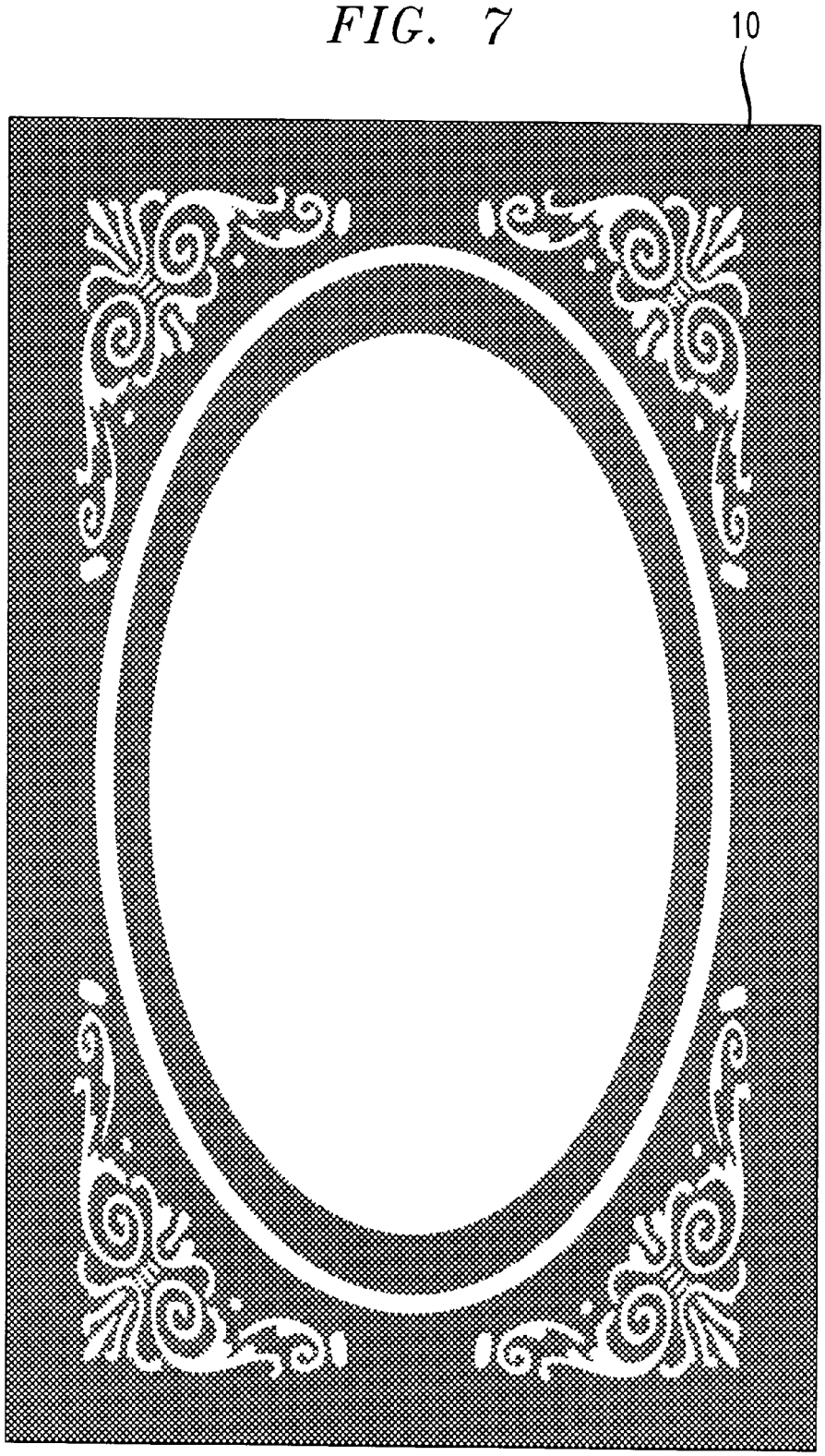
Figure 8:
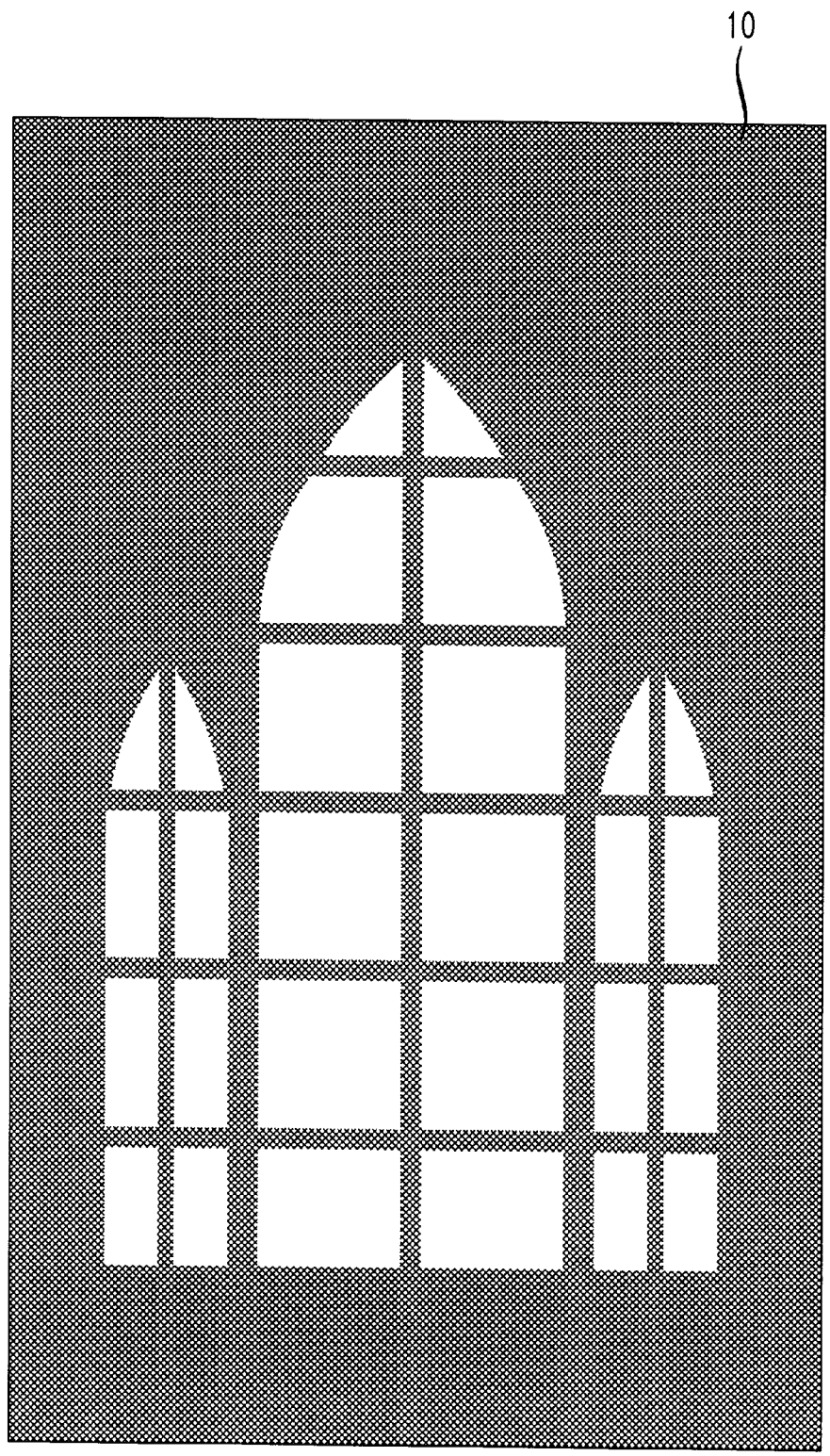
Figure 9:
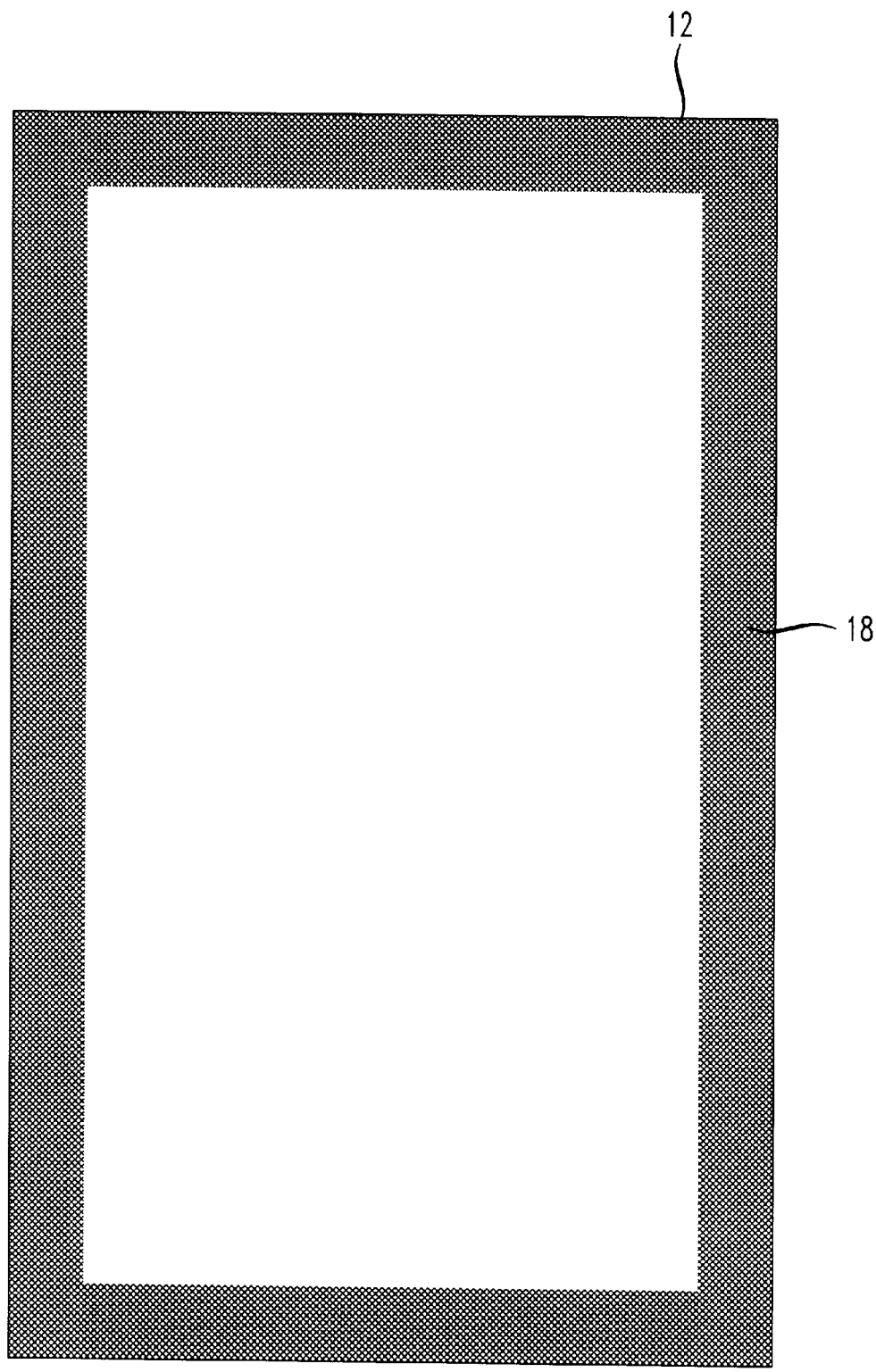
Figure 10:
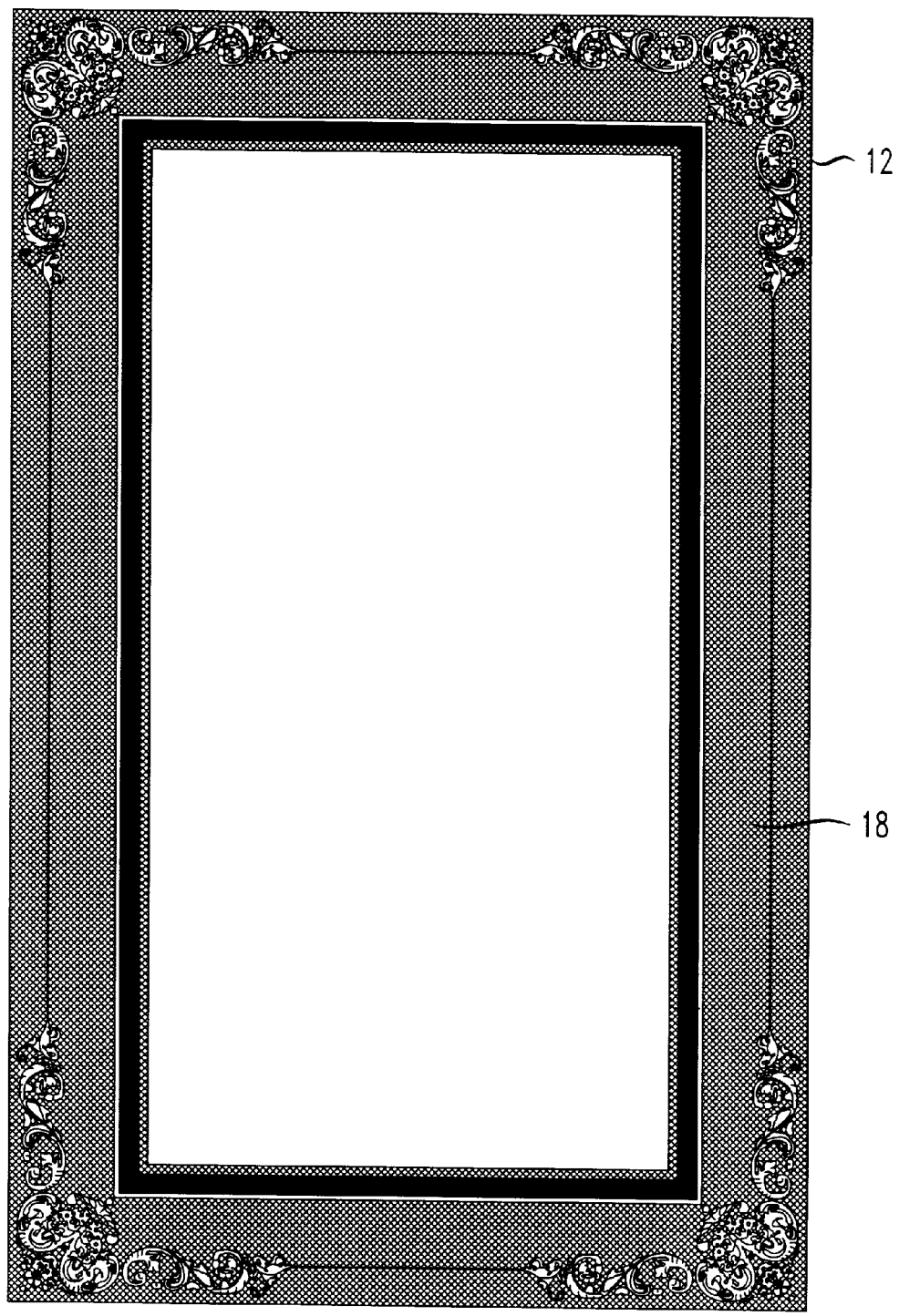

Border cut-out design sheet 12, which is the innermost layer viewable within a room in which the decorative window dressing 10 is hung, is generally fabricated from a sheet of flexible vinyl or plastic paper material or film, such as polyvinylchloride, and includes any of numerous cut-out designs and/or borders, examples which are illustrated in FIGS. 6–10. The cut-out designs and borders may be created using a stencil which is placed upon the sheet and traced, after which the design and/or border are cut out using a scissor or knife. Alternatively, a computer art and graphics program and printer may be used to generate border cut-out design sheet 12. The cutout design and/or border may take on the appearance of floral designs, as illustrated in FIGS. 2a, 2b and 6, replicas of famous artworks and sculptures, cartoon designs, comic strip and movie characters, logos frescoes, mosaics, tapestries and any other illustrations and border designs within one's imagination. Border cut-out design sheets 12 which are simply provided with a border, such as those illustrated in FIGS. 9 and 10 block out light only in the surrounding border portion 18.

Figure 3A:
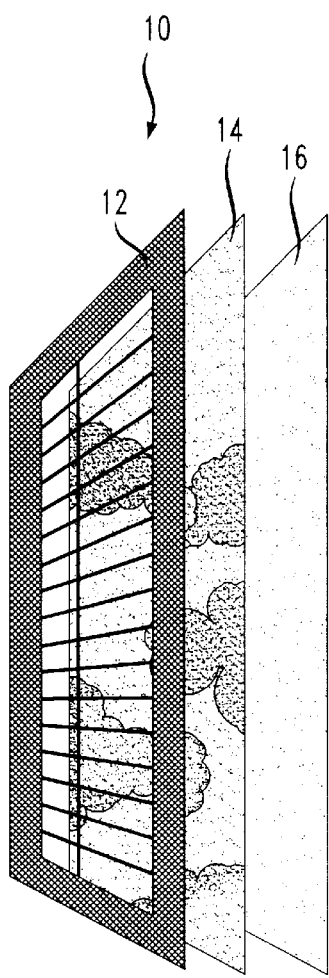
Figure 3B:
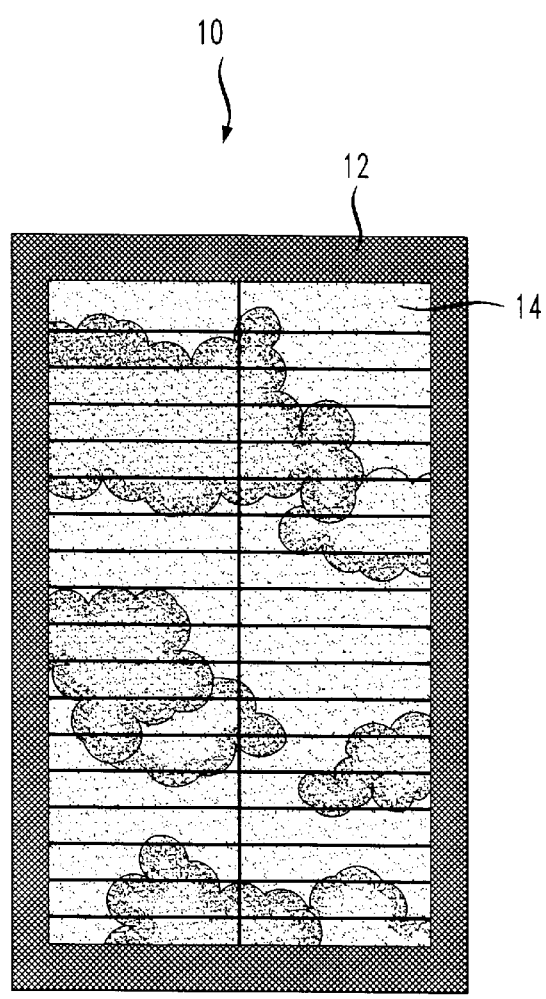
Figure 4:
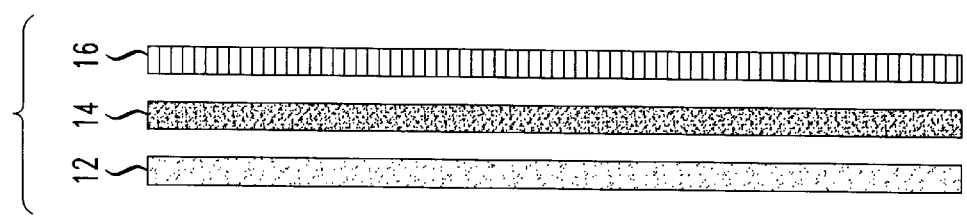
FIG. 4 illustrates a side view of the layers which comprise the decorative window dressings of the present invention.

Middle layer 14 comprises a colored sheet which may be provided in a single color, multi colors, or having a design such as the sky and cloud theme illustrated in FIGS. 3a and 3b. Middle layer 14 is generally colored using a translucent ink. Middle layer 14 may also be generated using a color bubble or laser jet printer. It is understood that the invention is not limited in the method of coloring or the materials used to color middle layer 14. Middle layer 10 is also generally fabricated from a sheet of flexible vinyl or plastic paper material or film, such as polyvinylchloride. Depending upon the colors used and the density of the colors, the amount of light which passes through middle layer 14 may be diminished or increased. Middle layer 14 is secured between border cut-out design sheet 12 and backing sheet 16 using an adhesive which secures all three sheets, 12, 14 16 to one another. Backing sheet 16 is advantageously a sheet of flexible vinyl or plastic paper material or film of slightly greater rigidity than border cut-out design sheet 12 and 14 so as to provide support to sheets 12 and 14 adhered thereto. Backing sheet 16 may be frosted to regulate the amount of light which reaches middle layer 14 and which effectively passes through the cut-out portion of border cut-out design sheet 12.

In the preferred embodiment of the present invention, decorative window dressing 10 comprised of border cut-out design sheet 12, middle, colored layer 14 and a backing sheet 16 secured to one another, are attached at one end to a spring loaded roller which is hung within a window pane. To obtain the decorative and colorful affect, the decorative window dressing 10 is pulled downward to cover the window so as to permit outside sunlight to pass through the window and hence through decorative window dressing 10 which has been extended therein.

It is understood that although the decorative window dressing 10 has been discussed with reference to placement within window panes for covering windows, the invention is not limited in this respect. Decorative window dressing 10 may also be custom sized to fit over glass doors such as patio and sliding doors which permit the inflow of light therethrough.

Figure 11:
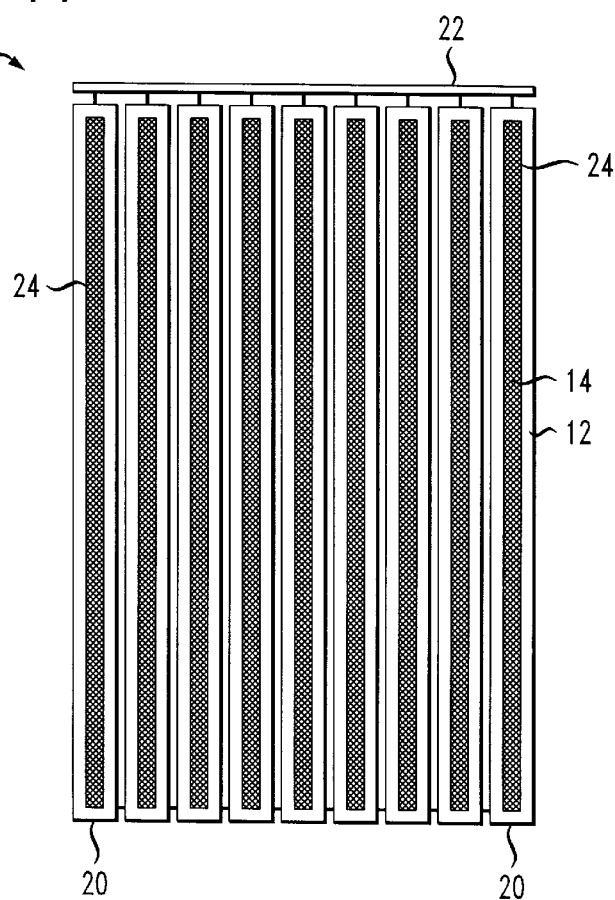
FIG. 11 illustrates an alternative embodiment of the decorative window dressing of the present invention comprising vertical slats.
Figure 12:
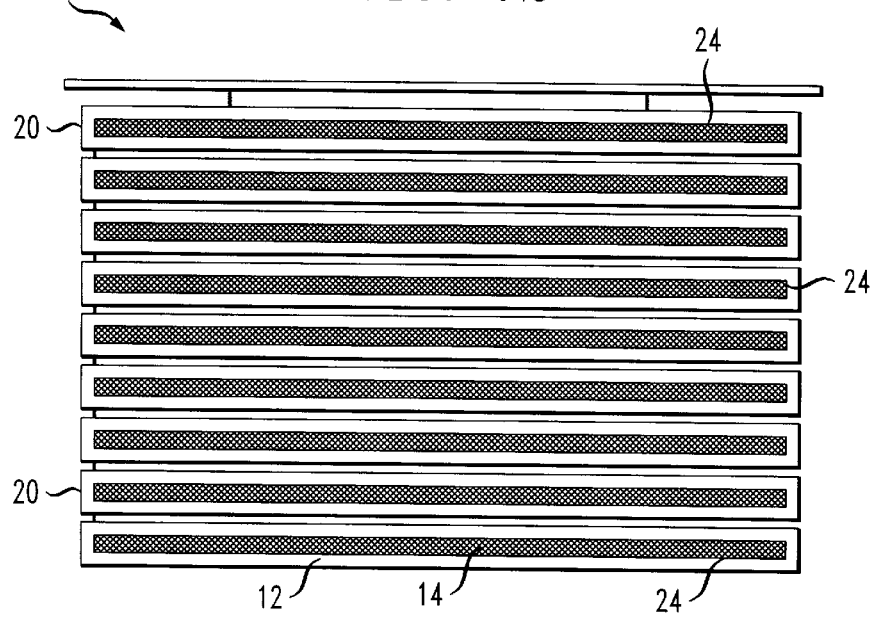
FIG. 12 illustrates another alternative embodiment of the decorative window dressing of present invention comprising horizontal slats.

In an alternative embodiment of the present invention illustrated in FIG. 11, there is shown the decorative window dressing 10 comprised of a plurality of vertical slats 20 attached to a hanging bar 22 for rotation thereon along a vertical axis. Slats 20 may be rotated between an open position and a closed position by an attached control rod (not shown). Similar to the decorative window dressings 10 of the embodiments discussed herein above, each slat 20 comprises a top border cut-out design sheet 12, and a middle, colored sheet 14 which are secured to each slat 20. Each slats 20 is provided with a cut-out portion 24 through which light passes when slats 20 are in a closed position as illustrated in FIG. 11. A top border cut-out design sheet 12 and a middle, colored layer 12 is positioned over each slat such that when slats 20 are in a closed position the light which passes through cut-out portion 24 in each of the slats 20 gives off a colorful and pleasing decorative effect. This embodiment is not limited to vertical slats, however, and horizontal slats 20 having a cut-out portion 24 upon which a top border cut-out design sheet 12, and a middle, colored sheet 14 which are positioned may be provided as well as illustrated in FIG. 12.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is to be understood that the drawings are not necessarily drawn to scale, but that they are merely conceptual in nature.

What is claimed is:

1. A decorative window dressing, comprising:
    a light impermeable border cut-out design sheet having a cut-out portion for permitting light to pass therethrough;
    a colored middle layer, and
    a backing sheet, wherein said colored middle layer is disposed between said border cut-out design sheet and said backing sheet, said colored middle layer is secured to said border cut-out design and to said backing sheet with an adhesive and said decorative widow dressing is positioned within a window frame such that when said decorative window dressing is extended in the window, incoming light, which passes through said cut-out portion in said border cut-out design sheet, creates an aesthetically pleasant colorful effect.

2. The decorative window dressing according to claim 1, wherein said border cut-out design sheet is a flexible sheet of plastic film.

3. The decorative window dressing according to claim 1, wherein said flexible sheet of plastic film is polyvinylchloride.

4. The decorative window dressing according to claim 1, further comprising a rod to which said decorative window dressing is attached for positioning within the window frame.

5. The decorative window dressing according to claim 1, wherein said cut-out portion of said border cut-out design sheet takes the shape of a design.

6. The decorative window dressing according to claim 5, wherein said design takes the form of famous artworks.

7. The decorative window dressing according to claim 5, wherein said design takes the form of floral arrangements.

8. The decorative window dressing according to claim 5, wherein said design takes the form of cartoon and comic book characters.

9. The decorative window dressing according to claim 1, wherein said colored middle layer is multi-colored.

10. The decorative window dressing according to claim 9, wherein said colored middle layer is colored with a translucent ink.

11. The decorative window dressing according to claim 1, wherein said backing sheet is frosted to regulate the intensity of light which passes through said decorative window dressing.

12. A decorative window dressing, comprising:

a plurality of individual slats connected at an upper end to a hanging bar and positioned for rotation thereon between an open position and a closed position, said hanging bar secured within a window frame such that said slats regulate the amount of incoming light, each slat provided with a cut-out portion through which incoming light passes when said slats are in the closed position;

a colored layer and a light impermeable border sheet secured to each of said individual slats, said colored layer positioned between said border sheet and said slat, said border sheet having a cut-out portion corresponding to said cut-out portion in each of said individual slats.

13. The decorative window dressing according to claim 12, wherein said slats vertically extend from said hanging bar and are mounted to said hanging bar for rotation thereon about a vertical axis defined along each of said slats.

14. A decorative window dressing, comprising:

a plurality of individual slats, each of said slats connected to a plurality of slat holders, said slat holders attached at an upper end to a hanging bar, said slats positioned for rotation on said slat holders between an open position and a closed position, said hanging bar secured within a window frame such that said slats regulate the amount of incoming light, each slat provided with a cut-out portion through which incoming light passes when said slats are in the closed position;

a colored layer and a border sheet secured to each of said individual slats, said colored layer positioned between said border sheet and said slat, said border sheet having a cut-out portion corresponding to said cut-out portion in each of said individual slats.

15. The decorative window dressing according to claim 14, wherein said slats horizontally extend from said slat holders and are mounted to said slat holders for rotation thereon about a horizontal defined along each of said slats.

* * * * *